(12) United States Patent
Li

(10) Patent No.: US 6,389,845 B1
(45) Date of Patent: May 21, 2002

(54) METHOD AND APPARATUS FOR SEPARATION OF $SF_6$ FROM $CF_4$/AIR-CONTAINING GAS STREAM

(75) Inventor: Yao-En Li, Buffalo Grove, IL (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 09/520,963

(22) Filed: Mar. 8, 2000

Related U.S. Application Data

(60) Provisional application No. 60/157,730, filed on Oct. 5, 1999.

(51) Int. Cl.⁷ .................................. F25J 3/00
(52) U.S. Cl. .................. 62/617; 62/918; 62/922
(58) Field of Search .................. 62/617, 624, 918, 62/922

(56) References Cited

U.S. PATENT DOCUMENTS

| | | | | | |
|---|---|---|---|---|---|
| 4,274,851 A | * | 6/1981 | Stokes | ......................... | 62/922 |
| 4,687,498 A | * | 8/1987 | Maclean et al. | ............... | 62/624 |
| 5,053,067 A | * | 10/1991 | Chretien | ....................... | 62/624 |
| 5,779,763 A | | 7/1998 | Pinnau et al. | | |
| 5,843,208 A | | 12/1998 | Anumakonda et al. | | |
| 5,919,285 A | | 7/1999 | Li et al. | | |
| 5,976,222 A | * | 11/1999 | Yang et al. | .................... | 95/45 |

FOREIGN PATENT DOCUMENTS

WO     98/32521     7/1998

* cited by examiner

Primary Examiner—William C. Doerrler
(74) Attorney, Agent, or Firm—Linda K. Russell

(57) ABSTRACT

A method and apparatus for the separation and recovery of $SF_6$ from a gas mixture consisting essentially of $SF_6$, $CF_4$, and $N_2$. The method and apparatus involve membrane separation to separate $N_2$ from $SF_6$ and $CF_4$, and liquefaction to separate $SF_6$ from $CF_4$.

29 Claims, 2 Drawing Sheets

METHOD AND APPARATUS FOR SEPARATION OF $SF_6$ FROM $CF_4$/AIR-CONTAINING GAS STREAM

CROSS-REFERENCE TO RELATED APPLICATION

This is a non-provisional application of Provisional Application No. 60/157,730, filed on Oct. 5, 1999. The benefit of that filing date is hereby claimed under 35 U.S.C. § 119. The entire content of the provisional application is hereby incorporated by reference.

FIELD OF THE INVENTION

The invention generally relates to the separation and recovery of $SF_6$ from a gas stream comprising $CF_4$ and at least one of air and nitrogen. The invention specifically relates to a method and apparatus for the separation and recovery of $SF_6$ from a gas stream comprising $CF_4$ and at least one of air and nitrogen using a combination of membrane and liquefaction separation techniques.

BACKGROUND OF THE INVENTION

Sulfur hexafluoride ($SF_6$) is widely used in the electric power distribution industry. In particular, $SF_6$ is used as an insulator or dielectric gas in power distribution equipment such as transformers, switch boxes, gas insulated lines, and substations. Under high voltage conditions, $SF_6$ decomposes into various polar components including HF, $F^+$, $SO_2$, and the like. These by-products degrade the insulating qualities of the gas. As a result, the gas has to be replaced or refined periodically, In addition to the formation of these polar by-products, carbon tetrafluoride ($CF_4$) is also generated during arcing in the presence of carbon containing insulators such as the materials known under the trade designations Teflon® and Megelit®.

Currently, there are several known methods for purifying and recycling $SF_6$ used as an insulator in electrical equipment. These methods are based upon adsorption and liquefaction. The $SF_6$ polar decomposition by-products are removed by soda lime, activated alumina, or molecular sieves. The refined $SF_6$ is then refilled into the circuit breakers, substations, or transformers.

Due to both technical and environmental concerns, the use of $SF_6/N_2$ (or $SF_6$/air) mixtures has been suggested to replace pure $SF_6$ as a gaseous dielectric in the electric power distribution industry. However, there is no known method or apparatus that can economically and efficiently recover and refined $SF_6$ from a gas mixture containing $N_2$ or air and $CF_4$. Thus, there is a need in the industry for an economical and efficient method and apparatus for the capture and recycle of $SF_6/N_2$ mixture containing $CF_4$ and the polar by-products. The present invention is intended to address this need in the art.

SUMMARY OF THE INVENTION

Briefly, in one aspect, the present invention relates to a method for the paration of $SF_6$ from a gas mixture consisting essentially of $SF_6$, $CF_4$, and $N_2$.
The method comprises the steps of:
(a) contacting a gas mixture consisting essentially of $SF_6$, $CF_4$, and $N_2$ with a membrane at conditions effective to obtain a permeate stream rich in $N_2$ and a retentate stream rich in $SF_6$ and $CF_4$; and
(b) liquefying the retentate stream at conditions effective to obtain liquid $SF_6$ and gaseous $CF_4$.

In another aspect, the present invention relates to an apparatus for the separation of $SF_6$ from a gas mixture consisting essentially of $SF_6$, $CF_4$, and $N_2$.
The apparatus comprises:
(a) at least one membrane separation unit which permeates $N_2$ faster than $SF_6$ and $CF_4$; and
(b) means for liquefying a retentate stream comprising $SF_6$ and $CF_4$ from the at least one membrane separation unit to form liquid $SF_6$ and gaseous $CF_4$.

BRIEF DESCRIPTION OF THE DRAWINGS

The present invention will be described in greater detail with reference to the accompanying drawings in which like elements bear like reference numerals, and wherein.

DETAILED DESCRIPTION OF THE PREFERRED EMBODIMENTS

Figure 1:
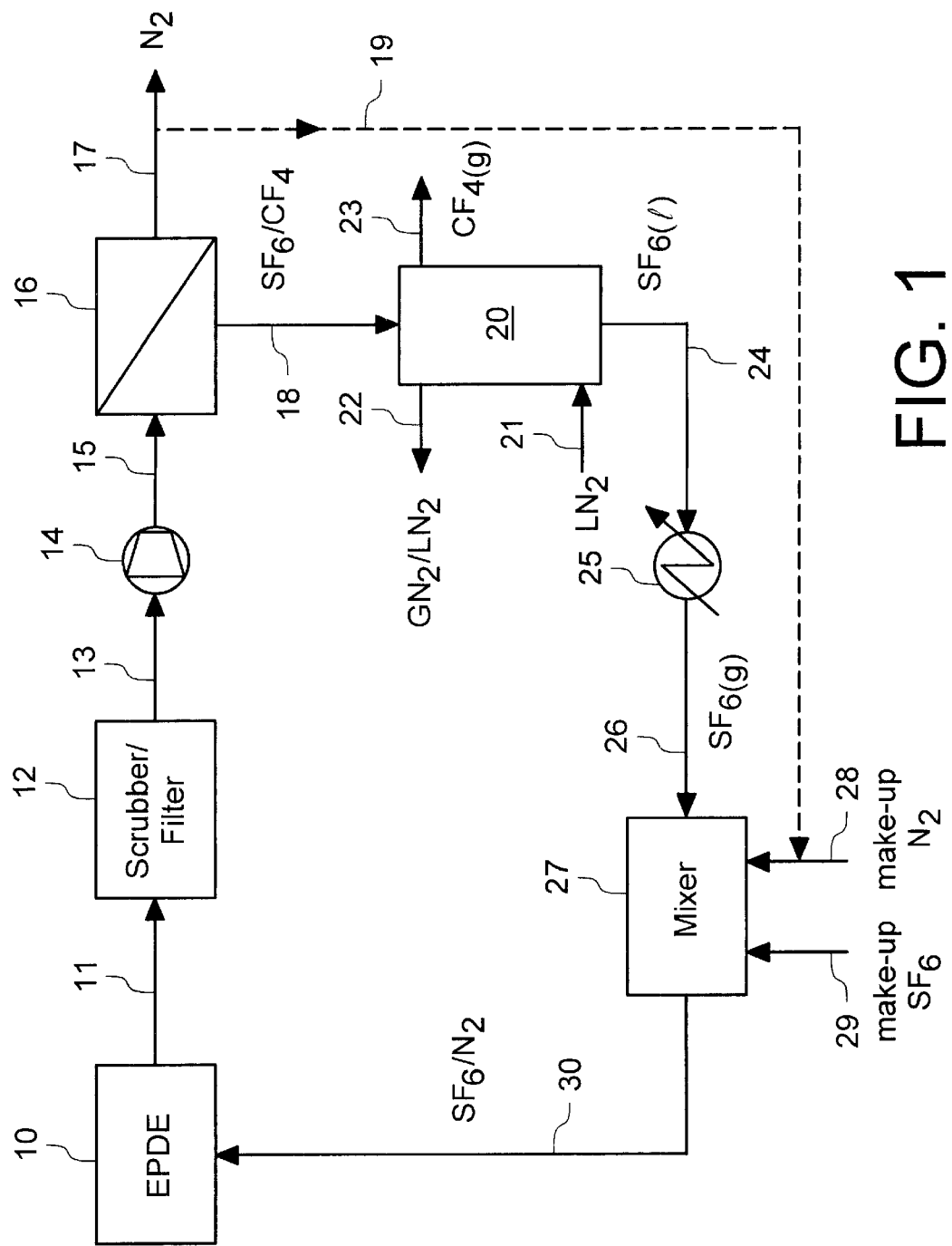
FIG. 1 is a schematic drawing of one preferred method and apparatus according to the invention.

FIG. 1 is a schematic drawing of one preferred method and apparatus according to the invention. Electric power distribution equipment ("EPDE") 10 can be any type of device used in the electric power industry for distributing power that contains an insulating or dielectric gas comprising a mixture of $SF_6$ and $N_2$ (or air). Such EPDE 10 include, for example, transformers, switch boxes, gas insulated lines, and substations.

Under high voltage conditions, $SF_6$ in the insulating gas mixture decomposes into various polar components including HF, $F^+$, $SO_2$, and the like as well as non-polar components including $CF_4$. The composition of such a gas mixture can vary over a wide range. For example, the insulating gas mixture can contain from about 10 vol % to about 90 vol % $SF_6$, from about 90 vol % to about 10 vol % $N_2$, from about 5 vol % to about 0.005 vol % $CF_4$, and from about 0.5 vol % to about 0.001 vol % polar by-products.

The insulating gas mixture is transferred from EPDE 10 to at least one scrubber/filter unit 12 via conduit 11. The scrubber/filter unit 12 is designed to remove the $SF_6$ polar decomposition by-products from the insulating gas mixture to produce a gas mixture 13 depleted in the $SF_6$ polar decomposition by-products. As used herein, the term "depleted" means that the concentration of a specified component(s) in the effluent stream of a particular separation step or unit is less than the concentration of the same component(s) in the feed stream to that particular separation step or unit.

The scrubber/filter may be conducted at a pressure ranging from 1 to 50 bar. The temperature for carrying out this step can vary from 20° C. to 100° C. The flow rate per unit scrubber/filter unit (i.e., space velocity) can vary from 0.1 to 20 $min^{-1}$.

Any scrubber/filter material can be used in the present invention so long as the material can selectively remove the $SF_6$ polar decomposition by-products from the gas mixture in line 11. Suitable scrubber/filter materials include molecular sieves, soda lime, and activated alumina.

The amount of scrubber/filter material used, of course, varies depending on the amount of polar by-products to be removed and the desired purity of the product gas 13. Such a determination is within the scope of one skilled in the art. Generally, a weight of scrubber/filter material corresponding to 10% of the weight of the gas to be separated is used.

The gas mixture 13 existing the scrubber/filter unit 12 and depleted in the $SF_6$ polar decomposition by-products is compressed in compressor 14 to form a compressed gas mixture 15 having a pressure ranging from about 3 to about 10 bar. Preferred compressors are sealed and oil-free, such as the compressors sold under the tradename POWEREX, available from the Powerex Harrison Company of Ohio.

The compressed gas mixture 15 is then passed to at least one membrane separation unit 16 at conditions effective to obtain a permeate stream 17 rich in $N_2$ and a retentate stream 18 rich in $SF_6$ and $CF_4$. As used herein, the term "rich" means that the concentration of a specified component(s) in the effluent stream of a particular separation step or unit is greater than the concentration of the same component(s) in the feed stream to that particular separation step or unit.

Any membrane can be used in the present invention so long as the membrane can selectively retain $SF_6$ and $CF_4$ while passing the other components, such as $N_2$, in the compressed gas stream 15 through. The membrane should also be substantially non-reactive with the gaseous components to be separated.

In accordance with the foregoing, membranes most useful in the invention are preferably glassy membranes, such as polymer membranes made preferably from polyimides, polyamides, polyamide-imides, polyesters, polycarbonates, polysulfones, polyethersulfone, polyetherketone, alkyl substituted aromatic polyesters, blends of polyethersulfone, aromatic polyimides, aromatic polyamides, polyamidesimides, fluorinated aromatic polyamide, polyamide and polyamideimides, glassy polymeric membranes such as disclosed in U.S. Ser. No. 08/247,125 filed May 20, 1994 and incorporated herein by reference, cellulose acetates, and blends thereof, copolymers thereof, substituted polymers (e.g. alkyl, aryl) thereof and the like. Also sulfonated polymers as taught by U.S. Pat. No. 5,364,454 are within the scope of membranes useful in carrying out the present invention.

Asymmetric membranes are prepared by the precipitation of polymer solutions in solvent-miscible non-solvents. Such membranes are typified by a dense separating layer supported on an anisotropic substrate of a graded porosity and are generally prepared in one step. Examples of such membranes and their methods of manufacture are disclosed in U.S. Pat. Nos. 4,113,628; 4,378,324; 4,460,526; 4,474,662; 4,485,056; 4,512,893; 5,085,676; and 4,717,394; all incorporated herein by reference. Particularly preferred membranes are polyimide asymmetric gas separation membranes as disclosed in U.S. Pat. No. 5,085,676.

Some non-polymeric media fit the criteria for size-selection of gaseous and vapor components, and may be utilized in the practice of the present invention. Two such media which have been described for membrane application are carbon sieve and zeolite membranes. Both of these media separate species by a molecular sieving mechanism. Because of the highly discriminate nature of this process, very high selectivities can be achieved even between molecules of very similar size. For instance, a typical upper bound for $O_2/N_2$ selectivity for polymeric media is 8–10 while carbon sieve membranes have exhibited selectivities on the order of 12–14.

The most successful means of producing carbon sieve membranes has been performed by pyrolysis of a polymeric membrane precursor. Means of producing such membranes and characterization for separation of gaseous materials are described in:

A. Soffer, J. Koresh and S. Saggy, U.S. Pat. No. 4,685,940 (1987); H. yoneyama and Y. Nishihara, U.S. Pat. No. 5,089, 135 (1992); and C. W. Jones and W. J. Koros, *Carbon*, Vol. 32, p. 1419 (1994), all incorporated herein by reference.

Zeolite coated or filled membranes have also been shown to offer benefits for gaseous and vapor components, and are described in:

K. Kusakabe, S. Yoneshige, A. Murata and S. Morooka, *J. Membrane Science*, Vol. 116, p. 39 (1996); S. Morooka, S. Yan, K. Kusakabe and Y. Akiyama, *J. Membrane Science*, Vol. 101, p. 89 (1995); E. R. Geus, H. van Vekkum, W. J. W. Bakker and J. A. Moulijn, *Microporous Mater.*, Vol. 1, p. 131 (1993); and M. G. Suer, N. Bac and L. Yilmaz, *J. Membrane Science*, Vol. 9, p. 77 (1994), all incorporated herein by reference.

Such zeolite coated or filled membranes may be useful in the practice of the present invention.

In a pressure driven gas membrane separation process, one side of the gas separation membrane is contacted with a complex multicomponent gas mixture and certain of the gases of the mixture permeate through the membrane faster than the other gases. Gas separation membranes thereby allow some gases to permeate through them while serving as a barrier to other cases in a relative sense. The relative gas permeation rate through the membrane is a property of the membrane material composition and its morphology. It is believed that the intrinsic permeability of a polymer membrane is a combination of gas diffusion through the membrane, controlled in part by the packing and molecular free volume of the material, and gas solubility within the material. Selectivity is the ratio of the relative permeability of two gases being separated by a material. It is also highly desirable to form defect-free dense separating layers in order to retain high gas selectivity.

Composite gas separation membranes typically have a dense separating layer on a preformed microporous substrate. The separating layer and the substrate are usually different in composition. Composite gas separation membranes have evolved to a structure of an ultrathin, dense separating layer supported on an anisotropic, microporous substrate. Composite membrane structures can be prepared by laminating a preformed ultrathin dense separating layer on top of a preformed anisotropic support membrane. Examples of such membranes and their methods of manufacture are disclosed in U.S. Pat. Nos. 4,664,669; 4,689,267; 4,741,829; 2,947,687; 2,953,502; 3,616,607; 4,714,481; 4,602,922; 2,970,106; 2,960,462; 4,713,292; 4,086,310; 4,132,824; 4,192,824; 4,155,793; and 4,156,597, all incorporated herein by reference.

Alternatively, composite gas separation membranes may be prepared by multistep fabrication processes, wherein first an anisotropic, porous substrate is formed, followed by contacting the substrate with a membrane-forming solution. Examples of such methods are described in U.S. Pat. Nos. 4,826,599; 3,648,845; and 3,508,994, all incorporated herein by reference.

U.S. Pat. No. 4,756,932 (incorporated herein by reference) describes how composite hollow-fiber membranes may also be prepared by co-extrusion of multiple polymer solution layers, followed by precipitation in a solvent-miscible non-solvent.

According to one embodiment of the present invention, the membrane can be post-treated with, or coated by, or co-extruded with, a fluorinated or perfluorinated polymer layer in order to increase its ability to withstand harmful constituents in the gas mixture from which $SF_6$ and $CF_4$ are to be separate, at low levels or temporary contact with such components.

The hollow-fiber spinning process depends on many variables which may affect the morphology and properties of the hollow-fiber membrane. These variables include the composition of the polymer solution employed to form the fiber, the composition of fluid injected into the bore of the hollow-fiber extrudate during spinning, the temperature of the spinneret, the coagulation medium employed to treat the hollow-fiber extrudate, the temperature of the coagulation medium, the rapidity of coagulation of the polymer, the rate of extrusion of the fiber, take-up speed of the fiber onto the take-up roll, and the like. It may be preferable to modify the membrane morphology to enhance the separation efficiency. One such method is taught by U.S. Pat. No. 5,468,430.

The temperature of the compressed gas stream 15 and/or the membrane during the contacting step in each membrane separation unit 16 can vary from about −10° C. to about 100° C. Preferably, the temperature is between about 10° C. and 80° C. More preferably, the temperature ranges from ambient, i.e., from about 20° C. to 25° C., to about 60° C.

The flowrate of the compressed gas stream 15 across the membrane in each membrane separation unit 16 can vary from about 0 to about $10^5$ $Nm^3/h$ per square meter of membrane available for separation. Preferably, the flowrate ranges from about $10^{-4}$ to about 10 $Nm^3/h\text{-}m^2$. More preferably, the flowrate ranges from about 0.1 to about 0.5 $Nm^3/h\text{-}m^2$.

Of course, the particular contacting conditions in each membrane separation unit 16 may be the same or different, depending on various factors including the type of membrane employed as well as the degree of separation or purity desired. The selection of such parameters is within the level of skill of the ordinary worker in this art.

Both the permeate stream 17 and the retentate stream 18 may be contacted with additional membrane separation units (not shown) in order to improve the purity of those streams. Such a modification is within the scope of this invention.

The retentate stream 18 is then passed to a condensation unit 20 where $CF_4$ is separated from $SF_6$. In condensation unit 20, a nitrogen ("$LN_2$") through line 21 and discards, typically, a mixture of $LN_2$/gaseous nitrogen ("$GN_2$") in line 22. The condensation unit 20 is operated at a temperature ranging from about −10° C. to about −60° C. so as to produce a liquid $SF_6$ stream 24 and a gaseous $CF_4$ stream 23.

The liquid $SF_6$ stream 24 is then introduced into a heater/vaporizer 25 where the liquid $SF_6$ stream 24 is converted into a purified $SF_6$ gas stream 26. The purified $SF_6$ gas stream 26 is optionally mixed with make-up $N_2$ via line 28 and/or make-up $SF_6$ via line 29 in a mixer 27 to form a $SF_6/N_2$ recycle stream 30. The $SF_6/N_2$ recycle stream 30 can contain from about 5 vol % to about 95 vol % $SF_6$, and from about 95 vol % to about 5 vol % $N_2$. This stream 30 is recycled to EPDE 10. Optionally, the $N_2$ in permeate stream 17 may be transferred through line 19 to the mixer 27 and used as part of the make-up $N_2$ stream 28. Also optionally, the $GN_2$ in line 22 may also be used as part of the make-up $N_2$ stream 28 (not shown). A mixer suitable for use in this process is described in Applicant's Ser. No. 09/470,977, filed Dec. 23, 1999, incorporated herein by reference.

Figure 2:
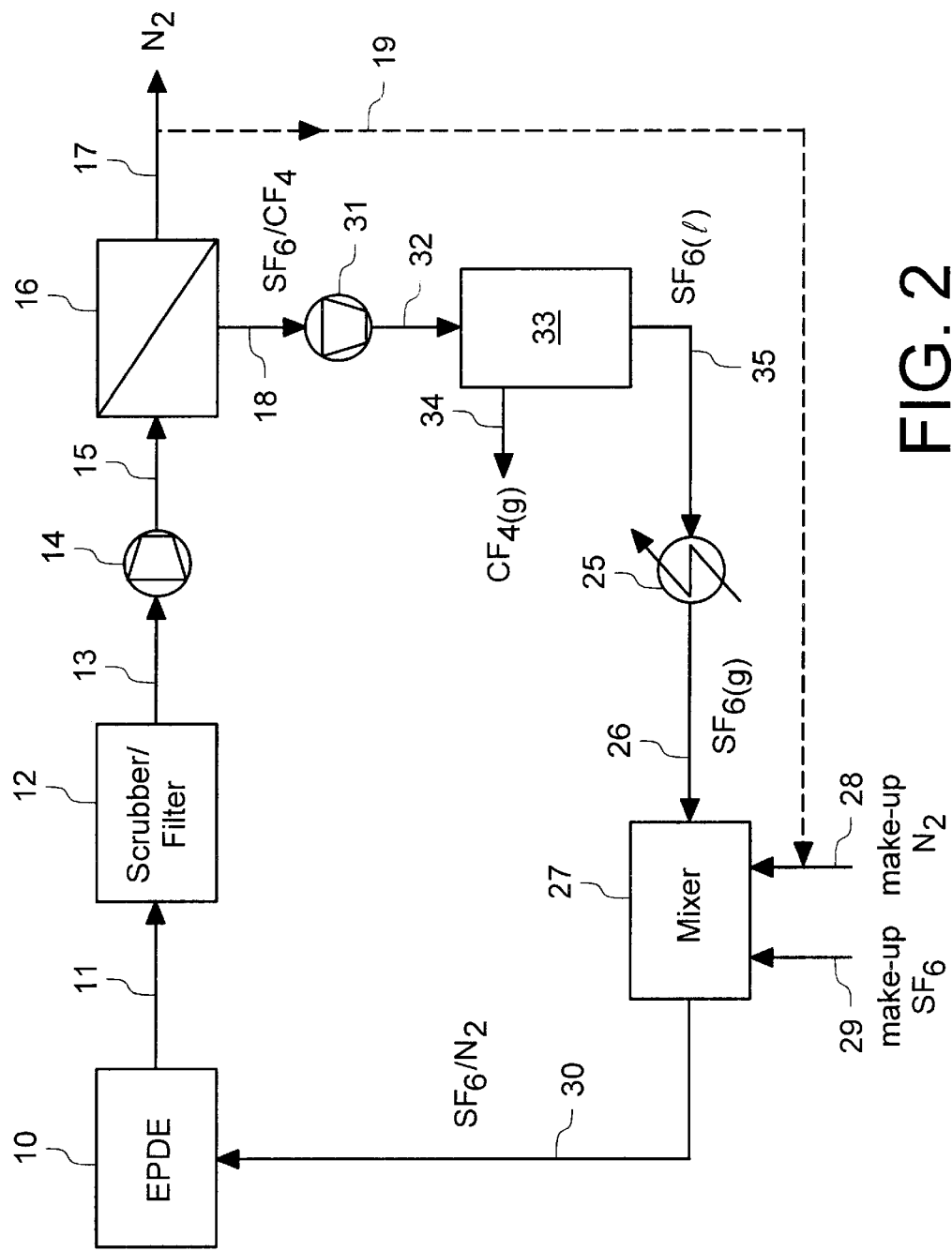
FIG. 2 is a schematic drawing of another preferred method and apparatus according to the invention.

FIG. 2 is a schematic drawing of another preferred method and apparatus according to the invention. The method and apparatus shown in FIG. 2 is the same shown in FIG. 1, except that condenser 20 has been replaced with compressor 31 and gas-liquid separator 33. In particular, the retentate stream 18 is compressed in compressor 21 to a pressure ranging from about 20 bar to about 50 bar to form a compressed retentate stream 32. The pressure provided by compressor 31 is sufficient to form liquid $SF_6$ while leaving $CF_4$ in gaseous form. Stream 32 is then introduced into the gas-liquid separator 33 wherein $CF_4$ gas is removed via line 34 and liquid $SF_6$ is withdrawn in line 35.

Prior to introduction into the mixer 27, the liquid $SF_6$ 35 is converted into a purified $SF_6$ gas stream 26 by heater/vaporizer 25.

While the invention has been described with reference to preferred embodiments, it is to be understood that variations and modifications may be resorted to as will be apparent to those skilled in the art. Such variations and modifications are to be considered within the purview and the scope of the claims appended hereto.

What is claimed is:

1. A method for the separation of $SF_6$ from a gas mixture consisting essentially of $SF_6$, $CF_4$, and $N_2$, said method comprising the steps of:
   (a) contacting a gas mixture consisting essentially of $SF_6$, $CF_4$, and $N_2$ with a membrane at conditions effective to obtain a permeate stream rich in $N_2$ and a retentate stream rich in $SF_6$ and $CF_4$;
   (b) liquefying said retentate stream at conditions effective to obtain liquid $SF_6$ and gaseous $CF_4$; and
   (c) vaporizing said liquid $SF_6$ to obtain a purified $SF_6$ gas.

2. The method according to claim 1, wherein said gas mixture further consists essentially of $SF_6$ polar decomposition by-products.

3. The method according to claim 2, wherein said by-products are HF, $F^{30}$, $SO_2$, or mixtures thereof.

4. The method according to claim 3, further comprising contacting said gas mixture, prior to step (a), with a scrubber/filter at conditions effective to remove said by-products and produce a gas mixture depleted in said by-products.

5. The method according to claim 4, wherein said scrubber/filter is selected from the group consisting of molecular sieves, soda lime, and activated alumina.

6. The method according to claim 1, wherein said gas mixture has a pressure of about 3 to about 10 bar.

7. The method according to claim 1, wherein said membrane is selected from the group consisting of polyimides, polyamides, polyamide-imides, polyesters, polycarbonates, polysulfones, polyethersulfone, polyetherketone, alkyl substituted aromatic polyesters, and blends of polyethersulfone, aromatic polyimides, aromatic polyamides, polyamides-imides, fluorinated aromatic polyimide, polyamide, and polyamide-imides.

8. The method according to claim 1, wherein said membrane is a molecular sieve membrane selected from the group consisting of zeolites and molecular sieve carbon.

9. The method according to claim 1, wherein said liquefying step is carried out by cooling said retentate stream to a temperature of about −10° C. to about −60° C.

10. The method according to claim 1, wherein said liquefying step is carried out by compressing said retentate stream to about 20 bar to about 50 bar.

11. The method according to claim 1, further comprising mixing said purified $SF_6$ gas with at least one of makeup $SF_6$ gas and makeup $N_2$ to form a purified $SF_6/N_2$ gas mixture.

12. The method according to claim 11, wherein said makeup $N_2$ comprises $N_2$ from said permeate stream.

13. The method according to claim 11, wherein said purified $SF_6/N_2$ gas mixture is recycled to said electric power distribution equipment.

14. A method for purifying and recycling an insulating or dielectric gas mixture from electric power distribution equipment, said method comprising the steps of:

(a) contacting a gas mixture consisting essentially of $SF_6$, $CF_4$, $N_2$, and $SF_6$ polar decomposition by-products from electric power distribution equipment with an adsorbent at conditions effective to adsorb said by-products and produce a gas mixture depleted in said by-products;

(b) contacting said gas mixture depleted in said by-products with a membrane at conditions effective to obtain a permeate stream rich in $N_2$ and a retentate stream rich in $SF_6$ and $CF_4$;

(c) liquefying said retentate stream at conditions effective to obtain liquid $SF_6$ and gaseous $CF_4$;

(d) vaporizing said liquid $SF_6$ to obtain a purified $SF_6$ gas;

(e) mixing said purified $SF_6$ gas with at least one of makeup $SF_6$ gas and makeup $N_2$ to form a purified $SF_6/N_2$ gas mixture; and (f) recycling said purified $SF_6/N_2$ gas mixture to said electric power distribution equipment.

15. An apparatus for the separation of $SF_6$ from a gas mixture consisting essentially of $SF_6$, $CF_4$, and $N_2$, said apparatus comprising:

(a) at least one membrane separation unit which permeates $N_2$ faster than $SF_6$ and $CF_4$; and (b) means for liquefying a retentate stream comprising $SF_6$ and $CF_4$ from said at least one membrane separation unit to form liquid $SF_6$ and gaseous $CF_4$.

16. The apparatus according to claim 15, further comprising at least one scrubber/filter unit, disposed upstream of said at least one membrane separation unit, for removing $SF_6$ polar decomposition by-products in said gas mixture.

17. The apparatus according to claim 16, wherein said at least one scrubber/filter unit comprises a material selected from the group consisting of molecular sieves, soda lime, and activated alumina.

18. The apparatus according to claim 15, further comprising a compressor for compressing said gas mixture to a pressure of about 3 to about 10 bar prior to introducing said gas mixture into said at least one membrane separation unit.

19. The apparatus according to claim 15, wherein said at least one membrane separation unit comprises a membrane selected from the group consisting of polyimides, polyamides, polyamide-imides, polyesters, polycarbonates, polysulfones, polyethersulfone, polyetherketone, alkyl substituted aromatic polyesters, and blends of polyethersulfone, aromatic polyimides, aromatic polyamides, polyamides-imides, fluorinated aromatic polyimide, polyamide, and polyamide-imides.

20. The apparatus according to claim 15, wherein said at least one membrane separation unit comprises a molecular sieve membrane selected from the group consisting of zeolites and molecular sieve carbon.

21. The apparatus according to claim 15, wherein said liquefying means comprises a heat exchanger for cooling said retentate stream to a temperature of about $-10°$ C. to about $-60°$ C.

22. The apparatus according to claim 15, wherein said liquefying means comprises a compressor for compressing said retentate stream to a pressure of about 20 bar to about 50 bar.

23. The apparatus according to claim 15, further comprising a vaporizer for converting said liquid $SF_6$ to a purified $SF_6$ gas.

24. The apparatus according to claim 23, further comprising a mixer for mixing said purified $SF_6$ gas with at least one of makeup $SF_6$ gas and makeup $N_2$ to form a purified $SF_6/N_2$ gas mixture.

25. The apparatus according to claim 24, further comprising a conduit for recycling $N_2$ from a permeate stream of said at least one membrane separation unit to said mixer.

26. The apparatus according to claim 25, further comprising a conduit for transferring an insulating or dielectric gas mixture from electric power distribution equipment to said at least one separation membrane unit.

27. The apparatus according to claim 26, further comprising a conduit for recycling said purified $SF_6/N_2$ gas mixture to said electric power distribution equipment.

28. An apparatus for purifying and recycling an insulating or dielectric gas mixture from electric power distribution equipment, said apparatus comprising:

(a) at least one adsorption unit for adsorbing $SF_6$ polar decomposition by-products from a gas mixture consisting essentially of $SF_6$, $CF_4$, and $N_2$ from electric power distribution equipment;

(b) at least one membrane separation unit which permeates $N_2$ faster than $SF_6$ and $CF_4$; and (c) means for liquefying a retentate stream comprising $SF_6$ and $CF_4$ from said at least one membrane separation unit to form liquid $SF_6$ and gaseous $CF_4$;

(d) a vaporizer for converting said liquid $SF_6$ to a purified $SF_6$ gas;

(e) a mixer for mixing said purified $SF_6$ gas with at least one of makeup $SF_6$ gas and makeup $N_2$ to form a purified $SF_6/N_2$ gas mixture; and (f) a conduit for recycling said purified $SF_6/N_2$ gas mixture to said electric power distribution equipment.

29. The method according to claim 12, wherein said gas mixture is from electric power distribution equipment.

* * * * *

UNITED STATES PATENT AND TRADEMARK OFFICE
CERTIFICATE OF CORRECTION

PATENT NO. : 6,389,845 B1
DATED : May 21, 2002
INVENTOR(S) : Yao-En Li

It is certified that error appears in the above-identified patent and that said Letters Patent is hereby corrected as shown below:

Column 6,
Line 29, please replace "$F^{30}$" with -- $F^+$ --.
Line 62, please replace the number "11" with the number -- 29 --.

Signed and Sealed this

Eleventh Day of February, 2003

JAMES E. ROGAN
*Director of the United States Patent and Trademark Office*